US008996657B2

(12) United States Patent
Verma et al.

(10) Patent No.: US 8,996,657 B2
(45) Date of Patent: Mar. 31, 2015

(54) SYSTEMS AND METHODS FOR MULTIPLEXING NETWORK CHANNELS

(75) Inventors: Basant Verma, Bangalore (IN); Kevin Piazza, Santa Ana, CA (US); Weichin Lo Hsu, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 13/212,995

(22) Filed: Aug. 18, 2011

(65) Prior Publication Data

US 2012/0054851 A1 Mar. 1, 2012

Related U.S. Application Data

(63) Continuation-in-part of application No. 12/874,143, filed on Sep. 1, 2010, now abandoned.

(51) Int. Cl.
  *G06F 15/16* (2006.01)
  *H04L 29/06* (2006.01)
  *H04L 29/08* (2006.01)

(52) U.S. Cl.
  CPC .......... *H04L 63/0209* (2013.01); *H04L 67/02* (2013.01); *H04L 67/2833* (2013.01); *H04L 69/163* (2013.01); *H04L 63/0281* (2013.01); *H04L 63/164* (2013.01)
  USPC .......... 709/218; 709/217; 709/219; 709/227; 709/228

(58) Field of Classification Search
  CPC ... H04L 69/32; H04L 67/28; H04L 29/08792; H04L 47/193; H04L 47/40
  See application file for complete search history.

(56) References Cited

U.S. PATENT DOCUMENTS

| 6,104,716 A * | 8/2000 | Crichton et al. .............. 370/401 |
| 6,631,416 B2 | 10/2003 | Bendinelli et al. |
| 6,721,792 B2 | 4/2004 | Erickson et al. |
| 7,272,642 B2 | 9/2007 | Knight et al. |
| 7,333,990 B1 | 2/2008 | Thiagarajan et al. |
| 7,406,533 B2 | 7/2008 | Li et al. |

(Continued)

FOREIGN PATENT DOCUMENTS

CN 101317408 A 12/2008

OTHER PUBLICATIONS

A. Luotonen, "Tunneling SSL Through a WWW Proxy", IETF Draft, pp. 1 to 3, Dec. 14, 1995.

(Continued)

*Primary Examiner* — Djenane Bayard
(74) *Attorney, Agent, or Firm* — Canon U.S.A., Inc. IP Division

(57) ABSTRACT

A proxy consolidates multiple TCP requests from clients into one TCP connection between a proxy and server. A persistent TCP connection is opened between the proxy and server, and a connection request is received from a client at the proxy. A unique identifier is registered for the client, and the server is signaled over the persistent connection to register the unique identifier. A client connection is established between the client and proxy responsive to the connection request. A content request is received from the client over the client connection. The unique identifier is prepended to the content request, the prepended content request is forwarded to the server, and prepended content is received from the server. The identifier and the content are extracted from the prepended content, and a client and a client connection are identified that correspond to the extracted identifier. The extracted content is returned to the corresponding client.

20 Claims, 11 Drawing Sheets

(56) References Cited

U.S. PATENT DOCUMENTS

| | | |
|---|---|---|
| 7,486,698 B2 | 2/2009 | Betts et al. |
| 7,562,147 B1 | 7/2009 | Cohen |
| 8,238,241 B2 * | 8/2012 | Samuels et al. ............ 370/230.1 |
| 2002/0052931 A1 * | 5/2002 | Peiffer et al. ................ 709/218 |
| 2002/0078117 A1 * | 6/2002 | Wang Baldonado et al. . 709/101 |
| 2002/0156901 A1 * | 10/2002 | Erickson et al. ............. 709/227 |
| 2003/0009571 A1 * | 1/2003 | Bavadekar .................... 709/230 |
| 2003/0217149 A1 | 11/2003 | Crichton et al. |
| 2006/0026290 A1 | 2/2006 | Pulito et al. |
| 2006/0168321 A1 * | 7/2006 | Eisenberg et al. ............ 709/238 |
| 2006/0200849 A1 | 9/2006 | Sundarrajan et al. |
| 2008/0034092 A1 * | 2/2008 | Kikuchi et al. ............... 709/225 |
| 2008/0114882 A1 | 5/2008 | Christenson |
| 2008/0229404 A1 | 9/2008 | Siegrist et al. |
| 2008/0320151 A1 | 12/2008 | McCanne et al. |
| 2009/0172801 A1 | 7/2009 | Friedrich et al. |
| 2009/0290540 A1 * | 11/2009 | Cherian et al. ................ 370/328 |

OTHER PUBLICATIONS

R. Dingledine, et al., "Tor: The Second-Generation Onion Router", 2004.

J. Reardon, "Improving Tor using a TCP-over-DTLS Tunnel", pp. 1 to 113, 2008.

P. Cameron, et al., "Transport Multiplexing Protocol (TMux)", Network Working Group, pp. 1 to 10, Aug. 1994.

U.S. Appl. No. 12/777,213, filed May 10, 2010. Applicants: Piazza, et al.

U.S. Appl. No. 12/777,219, filed May 10, 2010. Applicants: Piazza, et al.

* cited by examiner

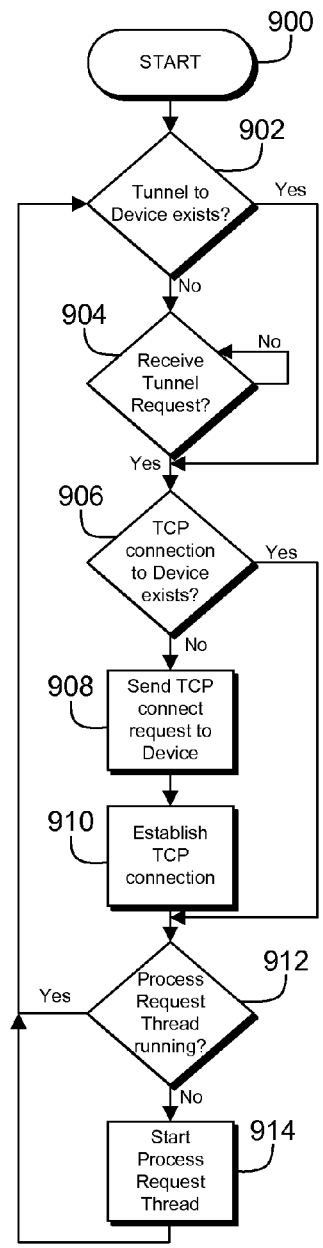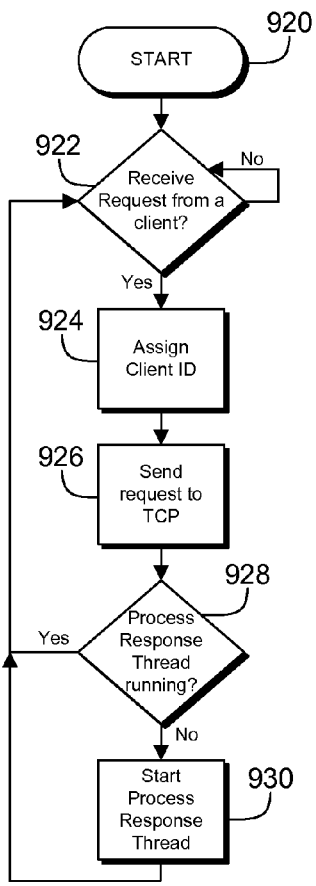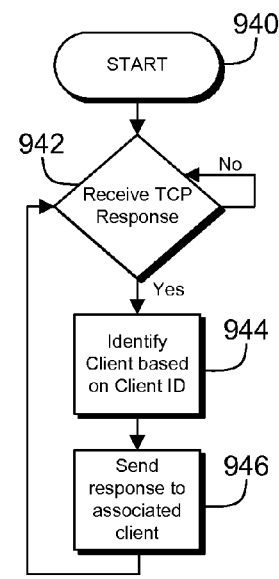
FIG. 9A
FIG. 9B
FIG. 9C

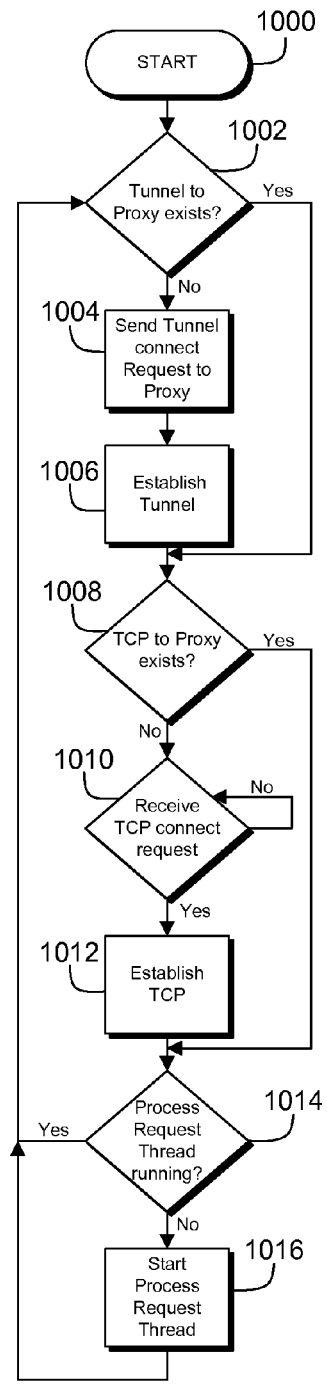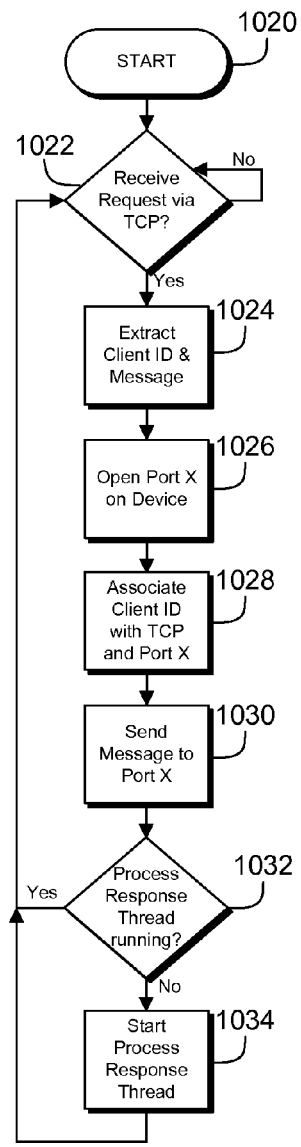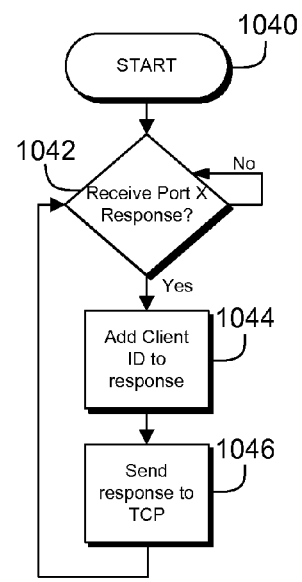
FIG. 10A
FIG. 10B
FIG. 10C

Proxy Table (1110)

| TCP Port (1111) | Client Port (1113) | Client ID (1117) |
|---|---|---|
| 1 | 103 | C6 |
| 1 | 52 | C3 |
| 1 | 74 | C11 |
| ⋮ | ⋮ | ⋮ |

Agent Table (1120)

| TCP Port (1121) | Client ID (1123) | Target Port (1125) |
|---|---|---|
| 1 | C3 | 22 |
| 1 | C8 | 68 |
| 1 | C11 | 50 |
| ⋮ | ⋮ | ⋮ |

FIG. 11

SYSTEMS AND METHODS FOR MULTIPLEXING NETWORK CHANNELS

CROSS REFERENCE TO RELATED APPLICATIONS

This application is a continuation-in-part of U.S. patent application Ser. No. 12/874,143, filed Sep. 1, 2010, which is incorporated by reference in its entirety.

BACKGROUND

1. Field

The invention relates to the field of network communication systems. For example, TCP multiplexing over a proxy and/or an HTTP tunnel, and more particularly relates to TCP multiplexing over a proxy which consolidates multiple TCP requests from clients into one TCP connection between the proxy and a server.

2. Background

Transmission Control Protocol (TCP) is one of the main protocols in TCP/IP networks. Whereas the IP protocol deals only with packets, TCP enables two hosts to establish a connection and exchange streams of data.

It is common for applications and devices to communicate using the TCP protocol. Some higher-level protocols, such as Hypertext Transfer Protocol (HTTP), often require that multiple TCP connections be established during the communication process. For example, an application may initially contact a device's HTTP server on port 80. The HTTP server may respond to the application by having it retrieve the requested data from various ports, such as 81, 82 or 83. In this example, even though the original communication started on a known port (i.e., port 80), subsequent communication resulted in establishing other connections.

Furthermore, applications and devices often communicate through a firewall. The HTTP port (e.g., port 80) may be open for communication by firewalls, thus enabling at least one point of contact between the applications and devices. Applications and devices can communicate data through a firewall by sending TCP data of a single session over an HTTP connection. Once an HTTP connection is established, the data of the single session is typically sent as a byte stream, which is not in HTTP format.

SUMMARY

One problem with HTTP is that establishing an HTTP connection is typically a time-consuming process. Thus, for an application tunneling HTTP data, communication typically slows down when an HTTP connection is established every time a new port is needed. The above problem can be further affected when applications and devices are communicating through a firewall, and can lead to scalability issues. Of course, such slow down of communication is not limited to HTTP, and can apply to other protocols.

The present disclosure addresses the foregoing problems. Disclosed embodiments describe devices and methods for TCP multiplexing over a proxy and/or an HTTP tunnel, wherein the proxy consolidates multiple TCP requests from clients into one TCP connection between the proxy and a server.

In an example embodiment described herein, TCP multiplexing is performed over a proxy and/or an HTTP tunnel, wherein the proxy consolidates multiple TCP requests from clients into one TCP connection between the proxy and a server. A persistent TCP and/or HTTP connection is opened between the proxy and the server, and a connection request is received from a client at the proxy, wherein the connection request comprises a request for establishment of a new connection between the client and the server. A unique identifier is registered for the client, and the server is signaled over the persistent connection to register the unique identifier for the client. A client connection is established between the client and the proxy responsive to the connection request, and a content request is received from the client over the client connection, wherein the content request comprises a request for content on the server. The unique identifier for the client is prepended to the content request, the prepended content request is forwarded to the server over the persistent connection, and prepended content is received from the server over the persistent connection, wherein the prepended content includes an identifier prepended to content. The identifier and the content are extracted from the prepended content, and a client and a client connection are identified that correspond to the extracted identifier. The extracted content is returned to the client that corresponds to the extracted identifier over the client connection.

The opening of the persistent TCP connection between the proxy and the server can comprise exchanging an ECHO command between the server and the proxy. The server and the proxy can be separated by a firewall which exposes the proxy to incoming connection requests and which shields the server from such requests, and the opening of the persistent TCP connection between the proxy and the server can comprise receipt of an ECHO command from the server and a response thereto from the proxy. The persistent connection can be closed between the server and the proxy.

A command sequence can be composed which includes a command to register the client and the unique identifier of the client, and the signaling of the server can comprise sending the command sequence over the persistent connection to the server. A command sequence can be composed which includes a command to request content, the unique identifier of the client, and the content request from the client, and the forwarding of the prepended content request can comprise sending the command sequence to the server.

A request can be received from the client to close the client connection. Responsive to the request from the client to close the client connection, the client and its unique identifier can be unregistered, and the server can be signaled over the persistent connection to unregister the unique identifier.

In a further example embodiment, a server communicates with a proxy, wherein the proxy consolidates multiple TCP requests from clients into one TCP connection between the proxy and the server. A persistent TCP connection is opened between the proxy and the server, and a signal is received over the persistent connection to register a unique identifier for a client, based on a connection request from the client at the proxy, wherein the connection request comprises a request for establishment of a new connection between the client and the server. The unique identifier for the client is registered based on the signal. A content request is received from the proxy over the persistent connection, wherein a client connection is established between the client and the proxy responsive to the connection request, the content request is received by the proxy from the client over the client connection, the content request comprises a request for content on the server, and the content request is prepended with the unique identifier for the client. Content is obtained based on the prepended content request, and an identifier is prepended to the obtained content. The prepended content is sent to the proxy over the persistent connection, for extraction of the identifier and the content from the prepended content, identification of a client and a client connection corresponding to the extracted identifier, and return of the extracted content to the client that corresponds to the extracted identifier over the client connection.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 9A-C are flow diagrams that illustrate examples of embodiments of TCP multiplexing operations by a device proxy.

FIGS. 10A-C are flow diagrams that illustrate examples of embodiments of TCP multiplexing operations by an device agent.

FIG. 11 illustrates examples of embodiments of client ID tables.

DETAILED DESCRIPTION

Figure 1:
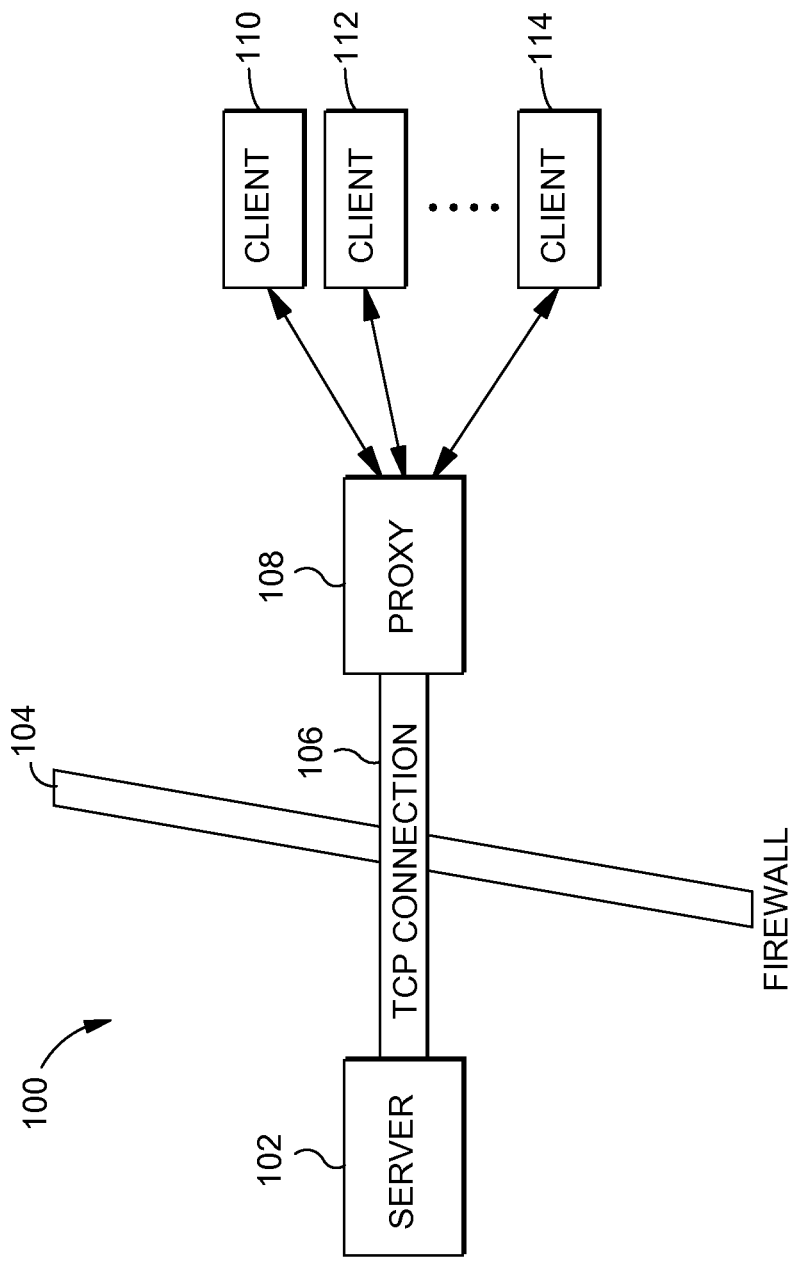
FIG. 1 is a depiction of a network environment which provides for TCP multiplexing according to an example embodiment.

FIG. 1 is a depiction of a network environment which provides for TCP multiplexing according to an example embodiment. Network environment 100 provides for TCP multiplexing over a proxy 108. More particularly, proxy 108 receives multiple TCP requests from clients 110, 112 and 114. Proxy 108 consolidates the multiple TCP requests into one TCP connection 106 between proxy 108 and a server 102. Server 102 and proxy 108 can be separated by a firewall 104, which exposes the proxy to incoming connection requests from clients 110 to 114 and which shields server 102 from such requests.

TCP connection 106 can be a persistent connection which is opened between proxy 108 and server 102. A connection request can be opened by any of clients 110 to 114 at proxy 108, where the connection request includes a request for establishment of a new connection between that client and server 102. A unique identifier can be registered for the client (e.g., client 110 to 114), and server 102 can be signaled over TCP connection 106 to register the unique identifier for the client. A client connection can be established between the client and proxy 108 responsive to the connection request. A content request can be received from the client over client connection, where the content request includes a request for content on server 102. The unique identifier for the client can be prepended to the content request, and the prepended content request can be forwarded to server 102 over TCP connection 106. The prepended content can be received from server 102 over TCP connection 106, where the prepended content includes an identifier prepended to content. The identifier and the content can be extracted from the prepended content, and a client (e.g., client 110 to 114) and a client connection can be identified that correspond to the extracted identifier. The extracted content can be returned to the client that corresponds to the extracted identifier over the client connection.

The opening of a persistent TCP connection 106 between proxy 108 and server 102 can include exchanging an ECHO command between server 102 and proxy 108. As noted above, server 102 and proxy 108 can be separated by firewall 104, which exposes proxy 108 to incoming connection requests and which shields server 102 from such requests. The opening of the persistent TCP connection 106 between proxy 108 and server 102 can include receipt of an ECHO command from server 102 and a response thereto from proxy 108. TCP connection 106 can be closed between server 102 and proxy 108.

A command sequence can be composed which includes a command to register the client (e.g., client 110 to 114) and the unique identifier of the client, and the signaling of server 102 can include sending the command sequence over TCP connection 106 to server 102. A command sequence can be composed which includes a command to request content, the unique identifier of the client, and the content request from the client, and the forwarding of the prepended content request can include sending the command sequence to server 102.

A request can be received from the client (e.g., client 110 to 114) to close the client connection. Responsive to the request from the client to close the client connection, the client and its unique identifier can be unregistered, and server 102 can be signaled over TCP connection 106 to unregister the unique identifier.

Figure 2:
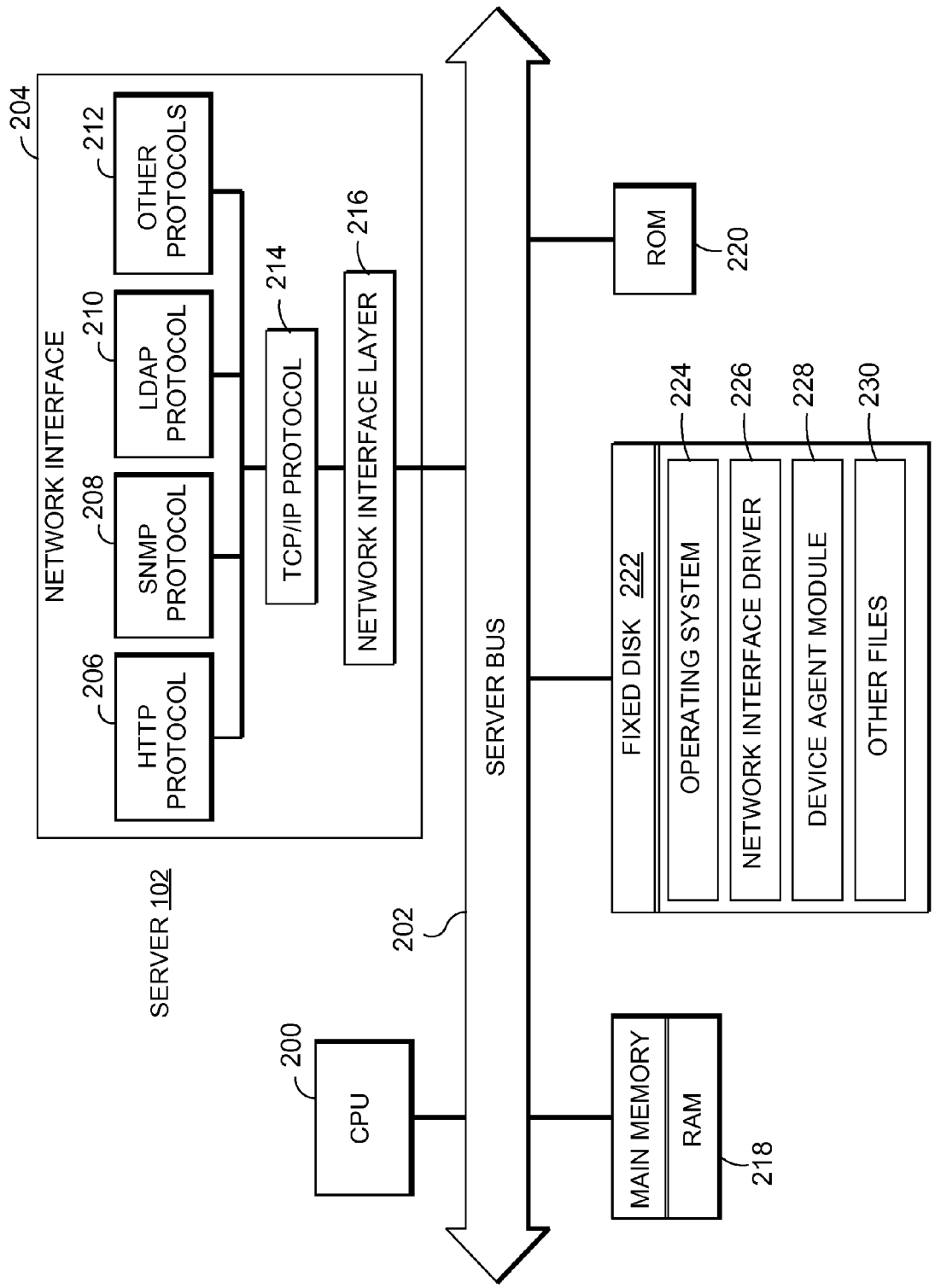
FIG. 2 is a block diagram depicting the internal architecture of the server shown in FIG. 1, according to an example embodiment.

FIG. 2 is a block diagram depicting the internal architecture of the server shown in FIG. 1, according to an example embodiment. Server 102 can correspond to a server for a target device (e.g., HTTP server). Such a server will be described in greater detail below with reference to a device agent, which is a target device-side component of a port forwarding system to help broker communication between a target device and a client (e.g., clients 110 to 114). The device agent can communicate with proxy 108, and can reside on the target device. Depending on the embodiment, the server 102 may be the target device, or the target device may be a separate device and the server 102 may manage communication between the target device and any clients.

In this regard, a port forwarding system can refer to a single device proxy and one or more assigned device agents working together to manage port forwarding tunnels. Further, port forwarding can refer to when traffic from a network port is passed to another network port.

In addition, port forwarding can refer to when an internal node must initiate a port forwarding session with an external node due to firewall restrictions. Once the session is established, the external node may forward network traffic to the internal node. It should be noted that such forwarding can also be referred to as "reverse" port forwarding.

As can be seen in FIG. 2, server 102 can include a central processing unit ("CPU") 200 such as a programmable microprocessor which can be interfaced to server bus 202. Also coupled to server bus 202 can be a network interface 204 for interfacing to proxy 108 or clients 110 to 114. In addition, random access memory ("RAM") 218, fixed disk 222, and read-only memory ("ROM") 220 can be coupled to server bus 202. RAM 218 can interface to server bus 202 to provide CPU 200 with access to memory storage, thereby acting as a main run-time memory for CPU 200. In particular, when executing stored program instruction sequences, CPU 200 can load those instruction sequences from fixed disk 222 (or other memory media) into RAM 218 and execute those stored program instruction sequences out of RAM 218. It should also be recognized that standard disk-swapping techniques can allow segment of memory to be swapped to and from RAM 218 and fixed disk 222.

ROM 220 can store invariant instruction sequences, such as start-up instruction sequences for CPU 200 or basic input/output operating system ("BIOS") sequences for the operation of network devices which may be attached to server 102. Network interface 204 can contain several modules to provide the appropriate interface functionality for server 102. For example, network interface 204 can contain network interface layer 216, which is typically a low-level protocol layer. TCP/IP layer 214 can be provided above network interface layer 216 for communicating over a network with proxy 108 or clients 110 to 114 via TCP/IP. Other protocols 212 can also be provided to allow server 102 to communicate over the network using other conventional protocols. In this regard, it is possible for HTTP protocol 206, SNMP protocol 208, and LDAP protocol 210 to be provided in network interface 204 for allowing server 102 to communicate to over a network using HTTP, SNMP and LDAP, respectively. However, it should be noted that HTTP, SNMP and LDAP protocols, along with other conventional protocols, can instead be provided by operating system 224. The foregoing protocols can allow for server 102 to communicate over a network (e.g., the Internet) with other devices.

Fixed disk 222 is one example of a computer-readable medium that stores program instruction sequences executable by CPU 200 so as to constitute operating system 224, network interface driver 226, device agent module 228 and other files 230. A computer-readable media may include magnetic storage devices (e.g., hard disk, floppy disk, magnetic tape), optical storage devices (e.g., CD, DVD, HD-DVD, Blu-ray), solid state devices (e.g., RAM, flash memory, solid state drive, SRAM, DRAM), a magneto-optical disc, erasable programmable read only memory (EPROM), and electrically erasable programmable read only memory (EEPROM). Operating system 224 can be an operating system such as DOS, Windows 95, Windows 98, Windows 2000, Windows XP, Windows 7, Windows NT, UNIX, or other such operating system. Network interface driver 226 can be utilized to drive network interface 204 for interfacing server 102 to proxy 108 or clients 110 to 114. Device agent module 228 can be utilized to implement the architecture for TCP multiplexing with proxy 108. As noted above, multiple TCP requests can be consolidated from clients 110 to 114 into one TCP connection 106 between proxy 108 and server 102. Other files 230 can contain other files or programs necessary to operate server 102 and/or to provide additional functionality to server 102.

Figure 3:
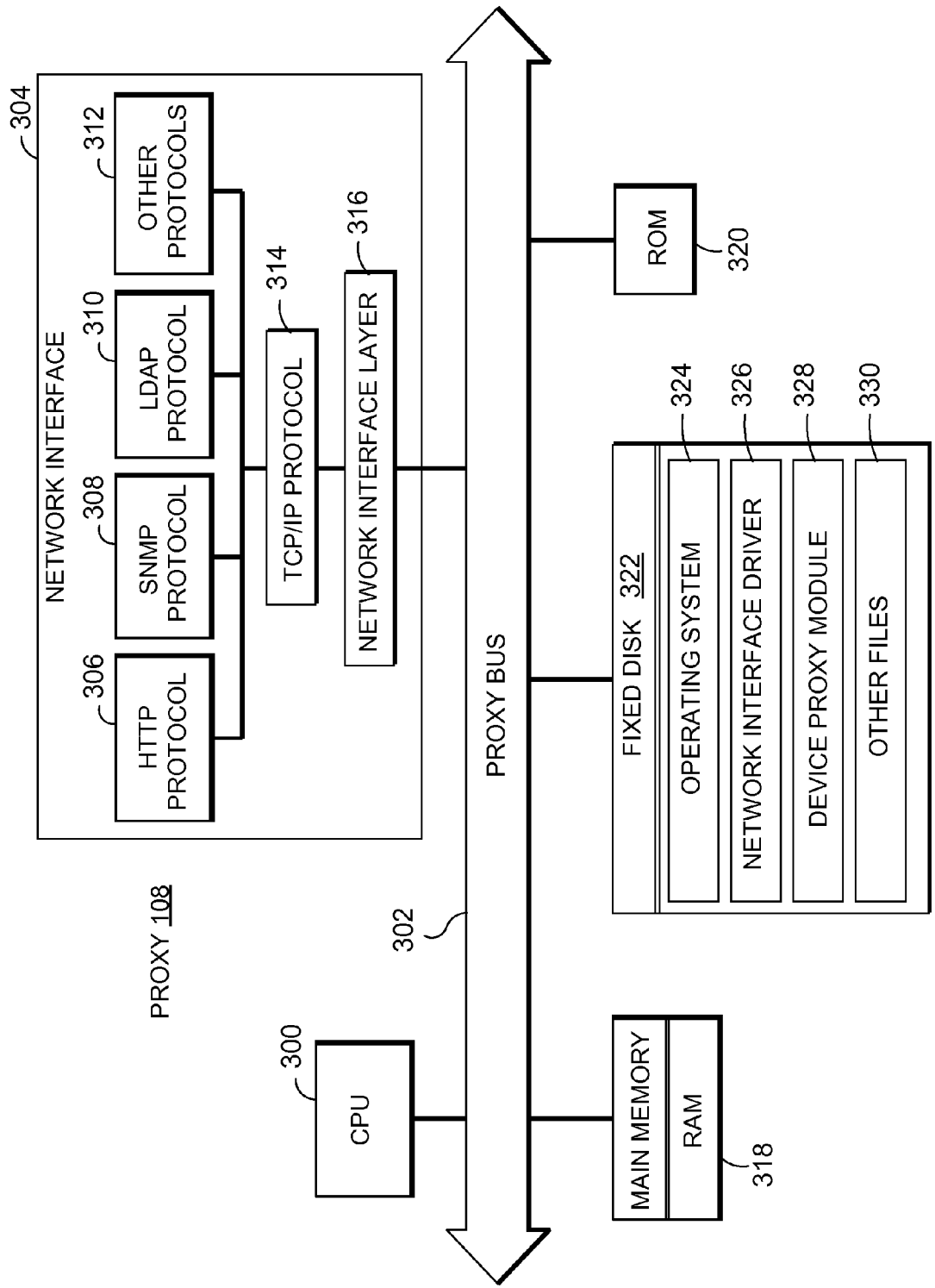
FIG. 3 is a block diagram depicting the internal architecture of the proxy shown in FIG. 1, according to an example embodiment.

FIG. 3 is a block diagram depicting the internal architecture of the proxy shown in FIG. 1, according to an example embodiment. Proxy 108 can correspond to a component of the port forwarding system to help broker communication between a target device and client application. For example, proxy 108 can correspond to a component on the internet. Further, the target device can be capable of communicating over a network and can execute the device agent, such as a multi-function printer (MFP). In addition, the target device may be separated from proxy 108 and the client application by a firewall.

Although an application from any of clients 110 to 114 can be designed to interact with a target device directly, it typically uses proxy 108 to do so, since the application may be running outside of the firewall. As noted above, proxy 108 receives multiple TCP requests from clients 110, 112 and 114, and consolidates the multiple TCP requests into one TCP connection 106 between proxy 108 and a server 102.

As can be seen in FIG. 3, proxy 108 can include a central processing unit ("CPU") 300 such as a programmable microprocessor which can be interfaced to proxy bus 302. Also coupled to proxy bus 302 can be a network interface 304 for interfacing to server 102 and clients 110 to 114. In addition, random access memory ("RAM") 318, fixed disk 322, and read-only memory ("ROM") 320 can be coupled to proxy bus 302. RAM 318 can interface to proxy bus 302 to provide CPU 300 with access to memory storage, thereby acting as a main run-time memory for CPU 300. In particular, when executing stored program instruction sequences, CPU 300 can load those instruction sequences from fixed disk 322 (or other memory media) into RAM 318 and execute those stored program instruction sequences out of RAM 318. It should also be recognized that standard disk-swapping techniques can allow segment of memory to be swapped to and from RAM 318 and fixed disk 322.

Network interface 304 can contain several modules to provide the appropriate interface functionality for proxy 108. For example, network interface 304 can contain network interface layer 316, which is typically a low-level protocol layer. TCP/IP layer 314 can be provided above network interface layer 316 for communicating over a network with server 102 and clients 110 to 114 via TCP/IP. Other protocols 312 can also be provided to allow proxy 108 to communicate to over the network using other conventional protocols. In this regard, it is possible for HTTP protocol 306, SNMP protocol 308, and LDAP protocol 310 to be provided in network interface 304 for allowing proxy 108 to communicate over a network using HTTP, SNMP and LDAP, respectively. However, it should be noted that HTTP, SNMP and LDAP protocols, along with other conventional protocols, can instead be provided by operating system 324. The foregoing protocols can allow for proxy 108 to communicate over a network (e.g., the Internet) with other devices (e.g., server 102 and clients 110 to 114).

Fixed disk 322 is one example of a computer-readable medium that stores program instruction sequences executable by CPU 300 so as to constitute operating system 324, network interface driver 326, device proxy module 328 and other files 330. Operating system 324 can be an operating system such as DOS, Windows 95, Windows 98, Windows 3000, Windows XP, Windows 7, Windows NT, UNIX, or other such operating system. Network interface driver 326 can be utilized to drive network interface 304 for interfacing proxy 108 to server 102 and clients 110 to 114. Device proxy module 328 can be utilized to implement the architecture for consolidating multiple TCP requests from clients (e.g., 110 to 114) into one TCP connection 106 between proxy 108 and server 102. Other files 330 can contain other files or programs necessary to operate proxy 108 and/or to provide additional functionality to proxy 108.

Figure 4:
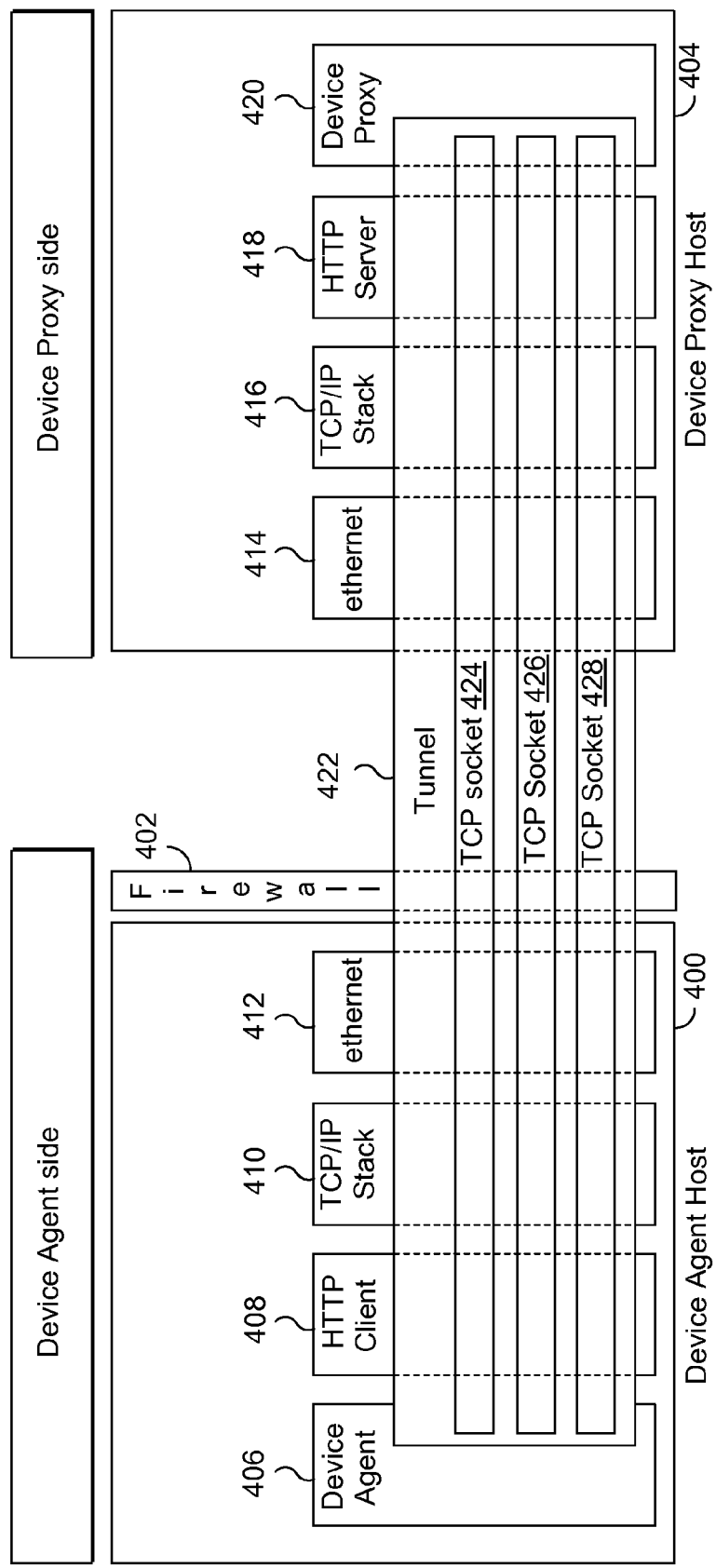
FIG. 4 is a diagram illustrating an example of network communication between a device agent host and a device proxy host according to an example embodiment.

FIG. 4 is a diagram illustrating an example of network communication between a device agent host and a device proxy host according to an example embodiment. For a communication path between a target device and an application which requests data from the target device, the coordination of tunneling data can occur on both the application side and the device side. Such coordination can be implemented in software, for example, as software drivers on both the application side and the device side. Of course, such implementation is not limited to software, and hardware can also be used.

With reference to FIG. 4, on the application side, the coordination of tunneling can be handled by a device proxy 420, which is included in device proxy host 404. In this regard, device proxy host 404 can correspond to proxy 108. Device proxy host 404 can also include Ethernet module 414, TCP/IP stack 416 and HTTP server 418. Ethernet module 414 can be part of network interface 304, and can be used by TCP/IP stack 416 to send and receive messages using TCP/IP protocol. TCP/IP stack 416 can be part of TCP/IP protocol 314. HTTP server 418 can use TCP/IP stack 416 to send and receive HTTP messages, and can use HTTP protocol 306 and network interface 304 to implement its services. In addition, HTTP server 418 can utilize TCP/IP stack 416 to provide TCP sockets (e.g., 424 to 428) to device proxy 420.

On the device side, the coordination of tunneling can be handled by a device agent 406, which is included in a device agent host 400. Device agent host 400 can correspond to server 102. TCP multiplexing can occur between device agent 400 and device proxy host 404, and the two hosts can be separated by a firewall 402. In this regard, device agent host can also include http client 408, TCP/IP stack 410 and Ethernet module 412. Ethernet module 412 can be part of network interface 204, and can be used by TCP/IP stack 410 to send and receive messages using TCP/IP protocol. TCP/IP stack 410 can be part of TCP/IP protocol 214. HTTP client 408 can use TCP/IP stack 410 to send and receive HTTP messages, and can use HTTP Protocol 206 and network interface 204 to implement its services. In addition, HTTP client 408 can utilize TCP/IP stack 410 to provide TCP sockets (e.g., 424 to 428) to device proxy 406.

In order to lessen the creation of connections such as HTTP connections, multiple TCP tunnels can be carried over a single connection between device agent host 400 and device proxy host 404. In this regard, device proxy 420 can consolidate multiple TCP requests from clients into one TCP connection (e.g., via tunnel 422) between device proxy host 404 and device agent host 400. Tunnel 422 can include multiple TCP sockets 424, 426 and 428 for communication between device agent host 400 and device proxy host 404. In one example embodiment, tunnel 422 is an HTTP tunnel.

To enable communication between device agent host 400 and device proxy host 404, the data stream tunneled through tunnel 422 can contain leading bytes of information (e.g., in the form of a header) to identify the data and to give direction to the receiver as to how to handle the data. In one example embodiment, the header may direct device agent 406 to create a new connection to device proxy host 404 for a particular client (e.g., client 110 to 114). Because the streams carry identifying information, multiple tunnels can be carried over a single connection via tunnel 422. The use of identifying information will be described in further detail below with reference to FIG. 5.

Figure 5:
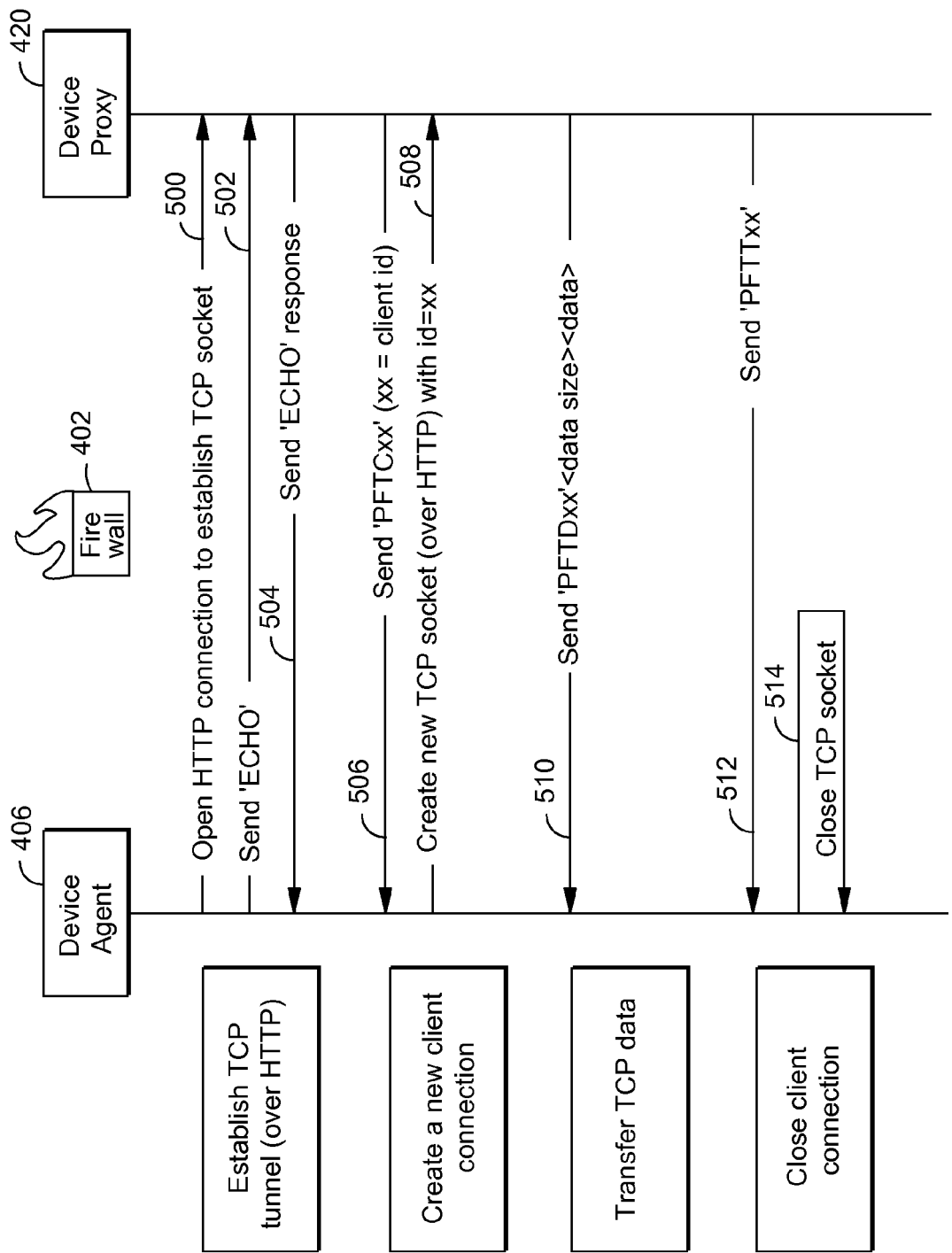
FIG. 5 is a sequence diagram illustrating different sequences for TCP multiplexing over a proxy according to an example embodiment.

FIG. 5 is a sequence diagram illustrating different sequences for TCP multiplexing over a device proxy according to an example embodiment. These different sequences include establishing a TCP tunnel, creating a new client connection, transferring TCP data, and closing a client connection.

In the examples of FIG. 5, the management of multiple clients over a single HTTP or Hypertext Transfer Protocol Secure (HTTPS) connection is illustrated, and the communication protocol for routing TCP data over such a connection (hereinafter "HTTP(S)") is shown. Of course, connections other than an HTTP(S) connection can be employed.

A description of the steps for establishing a TCP tunnel will now be described with reference to FIG. 5. At sequence step 500, device agent 406 opens an HTTP(S) connection to device proxy 420, to establish an HTTP(S)-based tunnel. At sequence step 502, after an initial HTTP specific handshake, device agent 406 sends an "ECHO" message (e.g., a 4-byte message) to device proxy 420, to indicate that device agent 406 is ready to communicate. At sequence step 504, if device proxy 420 receives an "ECHO" from device agent 406, device proxy 420 responds with an "ECHO" to indicate that device agent 406 can start listening for actual packets of data.

A description of the steps for creating a new client connection will now be described with reference to FIG. 5. When device proxy 420 detects a new client connection, it can assign a 2-character unique identifier to this client connection. The first character of the identifier can be 'c', and the second character can be a 1-byte number. This allows up to 256 clients to be connected to a single device agent socket at any given time. Of course, different configurations for identifiers can be used.

For example, at sequence step 506, device proxy 420 sends the following packet to device agent 406:
PFTC<client id>
In this example, PFTC indicates the request to create a new connection, and <client id> is the 2-character client identifier. At sequence step 508, once device agent 406 receives the above packet, device agent 406 creates a new TCP socket to device proxy 420 and assigns that socket to the above client identifier.

A description of the steps for transferring TCP data will now be described with reference to FIG. 5. At sequence step 510, after a connection is established, available TCP data can be transferred between device proxy 420 and device agent 046 using the following format:
PFTD<client id><data size><data>
In this example, PFTD indicates the request to transfer data, <client id> is the 2-character client identifier, <data size> is a 4-digit integer that indicates the number of bytes of attached data to read, and <data> is the actual TCP data to send to the destination.

A description of the steps for closing a client connection will now be described with reference to FIG. 5. At sequence step 512, the request to close a connection is sent from device proxy host 420 to device agent 406 in the following format:
PFTT<client id>
In this example, PFTT indicates the request to terminate an existing connection, and <client id> is the 2-character client identifier whose connection should be closed.

At sequence step 514, once the request is received, the open TCP socket should be closed. In this regard, to close the TCP tunnel, device proxy 420 closes the tunnel on device proxy 420 end, and device agent 406 closes the corresponding HTTP(S) connection to the device proxy 420.

Thus, TCP multiplexing can be performed over a proxy, where the proxy consolidates multiple TCP requests from clients into one TCP connection between the proxy and a server. In the example of FIG. 5, the proxy can correspond with device proxy 420 and the server can correspond with device agent 400.

Figure 6:
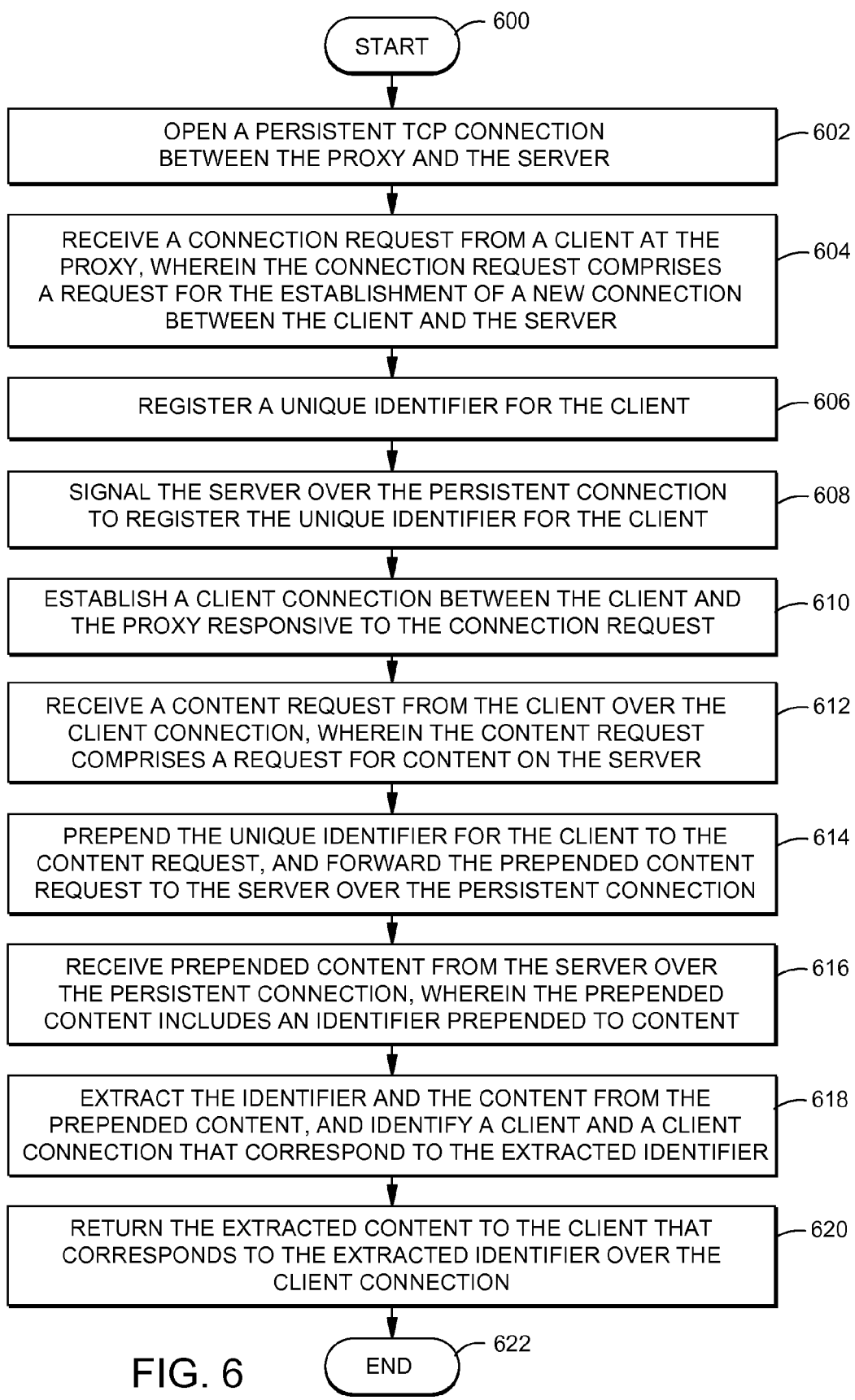
FIG. 6 is a flow diagram illustrating TCP multiplexing over a proxy according to an example embodiment.

FIG. 6 is a flow diagram further illustrating TCP multiplexing over a proxy, where the proxy consolidates multiple TCP requests from clients into one TCP connection between the proxy and a server.

Following start bubble 600, a persistent TCP connection is opened between the device proxy and the server (e.g., device agent host) at block 602. A connection request is received from a client at the device proxy, wherein the connection request comprises a request for establishment of a new connection between the client and the server (block 604), and a unique identifier is registered for the client (block 606).

The server is signaled over the persistent connection to register the unique identifier for the client (block 608), and a client connection is established between the client and the device proxy responsive to the connection request (block 610). A content request is received from the client over the client connection, wherein the content request comprises a request for content on the server (block 612).

The unique identifier for the client is prepended to the content request, and the prepended content request is forwarded to the server over the persistent connection (block 614). Prepended content is received from the server over the persistent connection, wherein the prepended content includes an identifier prepended to content (block 616).

The identifier and the content are extracted from the prepended content, and a client and a client connection are identified that correspond to the extracted identifier (block 618). The extracted content is returned to the client that corresponds to the extracted identifier over the client connection (block 620). The process ends (end bubble 622).

Figure 7:
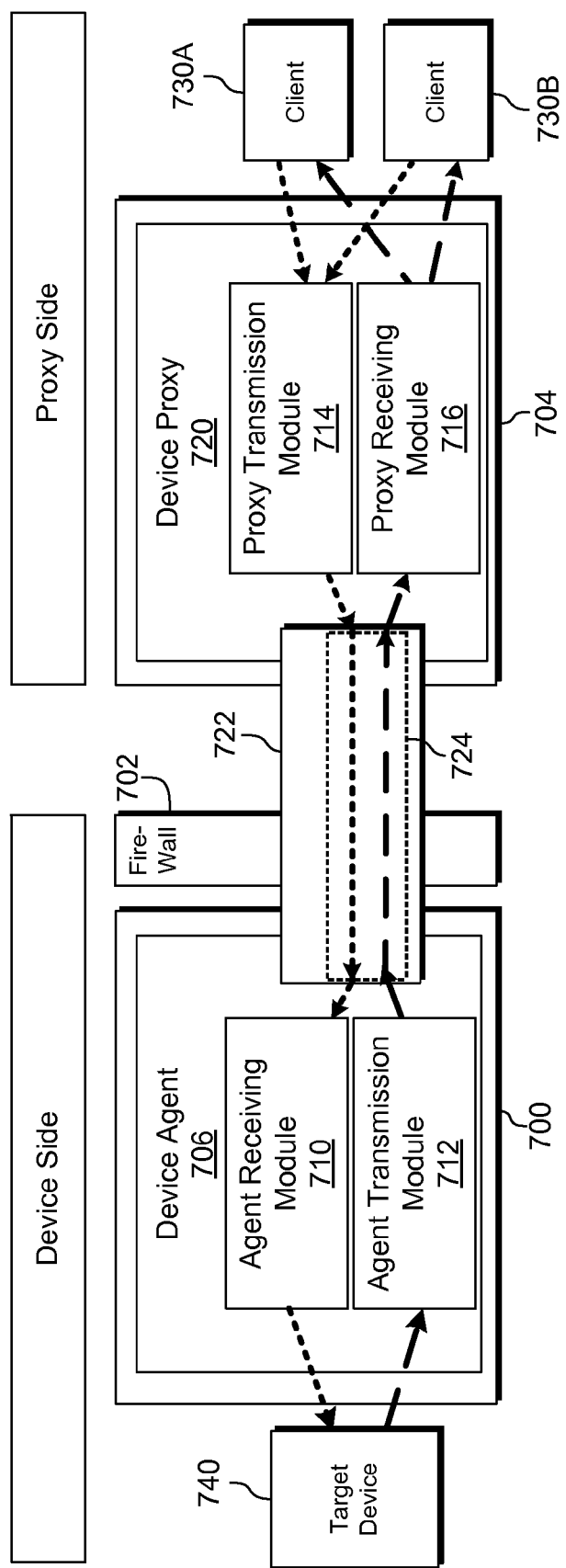
FIG. 7 is a diagram illustrating an example of network communication between a device agent host and a device proxy host according to an example embodiment.

FIG. 7 is a diagram illustrating an example of network communication between a target device 740 and two clients (client 730A and client 730B) via a device agent host 700 and a device proxy host 704 according to an example embodiment. The device agent host 700 includes a device agent 706 that communicates via a tunnel 722 with a device proxy 720, which is included in the device proxy host 704, and with clients 730A and 730B. The tunnel 722 includes a TCP socket 724, and the device proxy 720 multiplexes the TCP socket 724 to allow the clients 730A and 730B to share the TCP socket 724. The tunnel 722 permits communication through a firewall 702. Thus, the clients 730A and 730B may both use the TCP socket 724 to communicate with the device agent 706 and the target device 740, which may reduce the resources required to allow communication. For example, multiplexing of the TCP socket 724 may eliminate the overhead of opening multiple TCP sockets, which may be resource intensive or very time consuming. In the embodiment shown in FIG. 7, the target device 740 is a separate device than the device (e.g., the device agent host 700) that implements the device agent 700. The target device may be a computing device that has one or more CPUs, such as a printer, a scanner, a fax machine, a copy machine, a multi-function peripheral device, a laptop computer, a desktop computer, a phone, a server, a personal digital assistant, a camera, etc. In other embodiments, the target device may be the same device that implements the device agent 706.

The device proxy 720 includes a proxy transmission module 714 and a proxy receiving module 716. The proxy transmission module 714 receives data or instructions from a client and inserts the received data or instructions into a TCP packet and adds a client identifier to the TCP packet. The proxy transmission module 714 then sends the packet on the TCP socket 724. The proxy receiving module 716 receives TCP packets from the TCP socket 724 determines the respective client that the packet is addressed to (e.g., by extracting a client identifier from the received TCP packet). The proxy receiving module 716 sends received packets to the respective client.

The device agent 706 includes a device agent receiving module 710 and a device agent transmission module 712. The device agent receiving module 710 receives TCP packets from the TCP socket 724 and determines the respective client associated with the packet. The device agent 706 sends the received packet(s) to the target device 740. The device agent 706 and the target device 740 may open one or more ports to allow data to be exchanged between them.

The target device 740 may then perform operations based on the received packet(s) (which may be assembled together) associated with the client. Operations may include sending data to the associated client, receiving data from the associated client, or performing a function of the device (e.g., copying, scanning, changing to a low-power state, capturing a photo). The target device 740 sends data to the client via the device agent 706. The device agent transmission module 712 determines the client associated with an outgoing TCP packet (e.g., a packet received from the target device 740 and being sent to a client), adds the respective client identifier to the respective TCP packet, and sends the TCP packet on the TCP socket 724.

Figure 8:
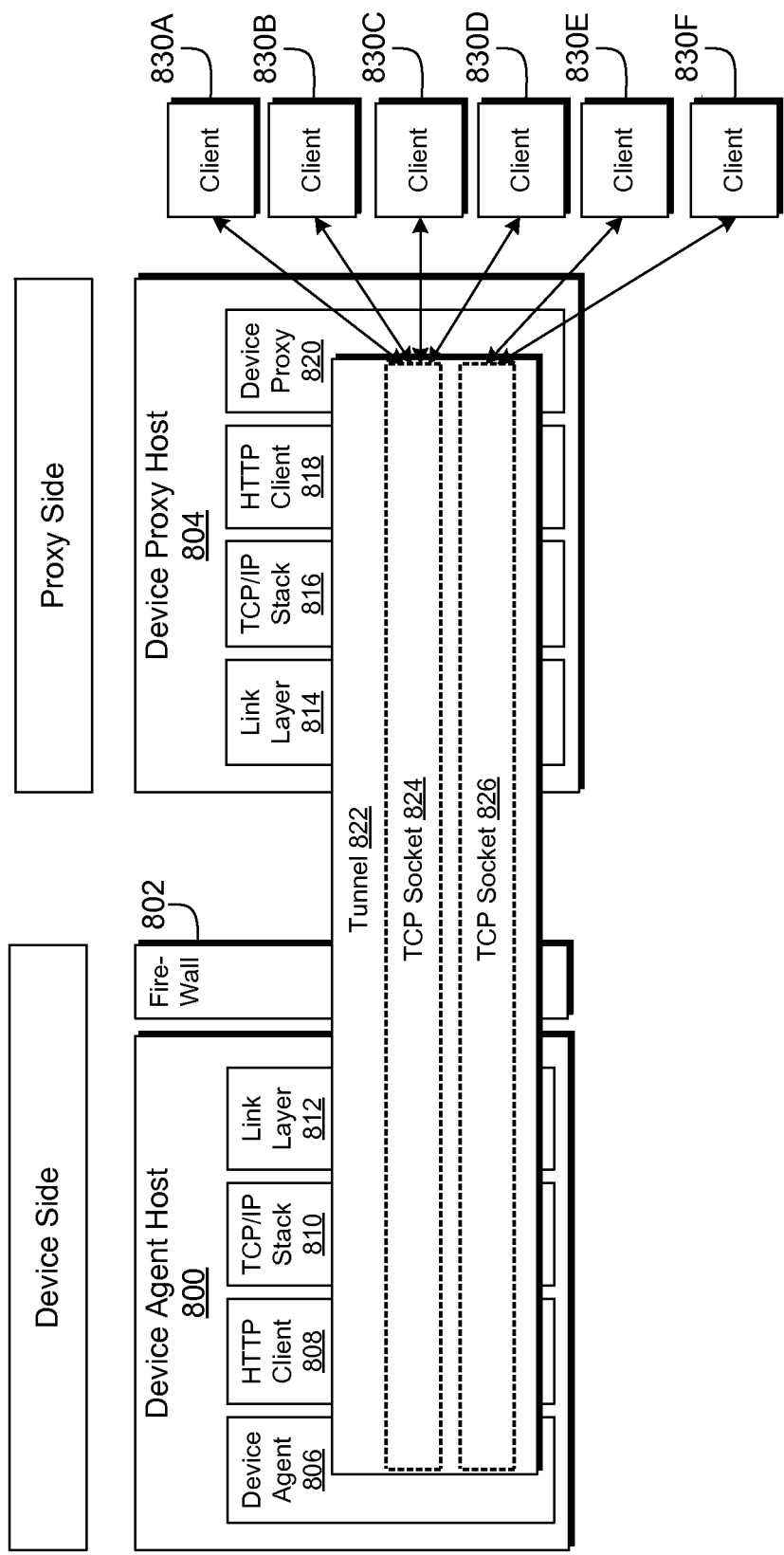
FIG. 8 is a diagram illustrating an example of network communications between a device agent host and a device proxy host according to an example embodiment.

FIG. 8 is a diagram illustrating an example of network communications between a device agent host 800 and a device proxy host 804 according to an example embodiment. The device agent host 800 communicates through a firewall 802 with the device proxy host 804 via a tunnel 822, and the tunnel 822 includes TCP sockets 824 and 826. The device agent host 800 includes a device agent 806, HTTP client 808, TCP/IP stack 810, and link layer 812, as described above in regards to FIG. 4. The device proxy host 804 includes a device proxy, a HTTP client 818, a TCP/IP stack 816, and a link layer 814, as discussed above in regards to FIG. 4. Additionally, in the embodiment shown in FIG. 8, the device agent host 800 is the target device.

The device agent host 700 in FIG. 7 corresponds to the device agent host 800 in FIG. 8. The device agent module 228 in FIG. 2 may include the device agent 706. The device agent module 228 in FIG. 2 may be executed by the CPU 200 in FIG. 2 to implement algorithms or operations shown in FIGS. 10A-10C. The device proxy module 328 in FIG. 3 may include the device proxy 720. The device proxy module 328 in FIG. 3 may be executed by the CPU 300 in FIG. 3 to perform algorithms or operations shown in FIGS. 9A-9C. The CPU 300 is an example of a computer processor. The CPU 300 and CPU 228 of course may be implemented by plural cores of CPU(s), multiple separated CPUs, or other hardware designs (e.g., CPUs that reside on different servers). Such CPU(s) may be also referred to as a computer processor, for example, in cloud computing environments.

Firewall 702 corresponds to firewall 802 in FIG. 8. Client 730A corresponds to client 830A and client 730B corresponds to client 830B. Tunnel 722 corresponds to tunnel 822. Block modules 706, 710, 712, 714, 716, and 720 in FIG. 7 and block modules 806, 808, 810, 812, 814, 816, 818, and 820 in FIG. 8 may be implemented by computer programs (e.g., software) which are performed by one or more computing devices. Such modules may also be realized by hardware circuit and/or hardware logic, for example ASICs (application-specific integrated circuits).

Multiple clients 830A-F may communicate with the device agent 806 (the target device in this embodiment) via the tunnel 822. The TCP sockets 824, 826 in the tunnel may each be shared by multiple clients 830A-F. FIG. 8 illustrates clients 830A-830D sharing a TCP socket 824 and illustrates clients 830E-F sharing a TCP socket 826, though other numbers of clients may share TCP sockets (e.g., 3, 6, 9). The device proxy 820 and the device agent 806 may open an additional TCP socket (an operation that is coordinated between the devices) when it detects a certain level of usage of any existing TCP sockets. For example, device proxy 820 and the device agent 806 may open up TCP socket 824 initially, and allow clients to use the TCP socket 824. The device proxy 820 may then detect that clients 830A-D use more than a threshold level of the capacity of the TCP socket 824, and the device proxy 820 and the device agent 806 may then open up another TCP socket 826. The device proxy 820 then multiplexes the TCP socket 826 among additional clients (e.g., clients 830E-F). The device proxy 820 may also close a TCP socket if usage on one or more TCP sockets falls below a certain level, and the clients may be consolidated together on one or more remaining TCP sockets.

FIGS. 9A-C are flow diagrams illustrating embodiments of TCP multiplexing. The operations and algorithms of the embodiments shown in FIGS. 9A-C may be implemented by a device proxy, for example. In FIG. 9A, flow starts in block 900 and proceeds to block 902, for example in response to a predetermined instruction to start a service including the flow shown in FIG. 9A, where it is determined if an HTTP tunnel to a device agent exists. Also, the service may start in response to user's input or predetermined a timer signal. If the HTTP tunnel does exist, then flow proceeds to block 906. If no HTTP tunnel exists, flow proceeds to block 904, where it is determined if an HTTP tunnel request is received. If no HTTP tunnel request is received, flow waits a block 904 for a tunnel request. If an HTTP tunnel request is received, flow proceeds to block 906. The HTTP tunnel(s) can be established by using HTTP. HTTP tunneling is a communication technique in which various network protocols, including TCP/IP, are encapsulated by HTTP. By using HTTP tunneling, computing devices can communicate using a predetermined communication protocol through a firewall.

In block 906, it is determined if a TCP connection to the device agent exists. If a TCP connection does exist then flow proceeds to block 912, otherwise flow proceeds to block 908. In block 908, a TCP connect request is sent to the device agent. Next, in block 910, a TCP connection is established. In some embodiments, the device proxy may wait to send the TCP connect request until the device proxy receives a request from a client, though in other embodiments the TCP connect request may be sent and a connection established in anticipation of a request from a client. In block 912, it is determined if a process request thread is running. If a process request thread is running, then flow returns to block 902. If not, flow proceeds to block 914, where a process request thread is started, and flow then proceeds to block 902.

In FIG. 9B, flow starts in block 920 (e.g., in response to the device proxy host starting a service, starting of a computing device that implements the device proxy, receipt of a user command) and proceeds to block 922. In block 922, it is determined if a request has been received from a client. If no request has been received, flow waits in block 922. If a request has been received from a client, then flow proceeds to block 924. In block 924, a client ID is assigned to the client and to the request (and an entry may be generated for a proxy table 1110, shown in FIG. 11). In block 926, the request (including the client ID) is sent to the TCP connection. Flow proceeds to block 928, where it is determined if a process response thread is running. If a process response thread is not running, flow proceeds to block 930 where a process response thread is started. If a process response thread is running in block 928 or once a process response thread is started in 930, flow proceeds to block 922, where it is determined if a new request is received from a client. If no request is received, flow waits in block 922. If a request is received, flow again proceeds to block 924.

In FIG. 9C, flow starts (e.g., in response to a device proxy host starting a service, receipt of a request from a client, sending an initial request to an agent, or in response to performance of block 930) in block 940 and proceeds to block 942. In block 942, it is determined if a TCP response has been received. If no TCP response has been received, flow waits in block 942. If a TCP response is received, flow proceeds to block 944, where a client is identified based on a client ID in the TCP response (e.g., using the proxy table 1110). Next, in block 946, the response is sent to the client associated with the client ID. Flow then returns to block 942 and waits for another TCP response to be received.

FIGS. 10A-C are flow diagrams illustrating embodiments of TCP multiplexing. The operations and algorithms of the embodiments shown in FIGS. 10A-C may be implemented by a device agent (e.g., device agent 706, modules 710, 712), for example. FIG. 10A starts in block 1000 (e.g., when a device agent starts a service or receives an instruction, when a timer expires), then flow proceeds to block 1002, where it is determined if a tunnel to a device proxy exists. If a tunnel exists then flow proceeds to block 1008, otherwise flow proceeds to block 1004, where a tunnel connect request is sent to the device proxy. Next, in block 1006, a tunnel is established. Flow proceeds to block 1008, where it is determined if a TCP connection to the device proxy exists. If yes, then flow proceeds to block 1014. If no, flow proceeds to block 1010, where it is determined if a TCP connect request has been received. If no request has been received, then the flow waits in block 1010. If a request has been received, then flow proceeds to block 1012, where a TCP connection is established (e.g., between the device agent and the device proxy). Next, in block 1014, it is determined if a process request thread is running. If yes, flow returns to block 1002. If no, flow proceeds to block 1016, where a process request thread is started, and then returns to block 1002.

FIG. 10B starts in block 1020 and proceeds to block 1022, where it is determined if a request has been received via the TCP connection. If a request has not been received, flow waits at block 1022. If a request has been received, flow proceeds to block 1024, where a client ID and message are extracted from the received request. Next, in block 1026, port x ('x' and 'y', as used herein, each represent an arbitrary port identifier, e.g., 80, 101, 34, 19) is opened between the device agent and target device (and an entry may be generated for the agent table 1120, shown in FIG. 11), and, in block 1028, the client ID is associated with the TCP connection and with port x. Next, the extracted message is sent to port x in block 1030, where the extracted message may be sent (e.g., sent by the port handler) to the target device (e.g., other applications, the operating system, other devices in communication with the device agent host, etc.) Flow then proceeds to block 1032, where it is determined if a process response thread is running. If yes, flow proceeds to block 1022, and, if no, flow proceeds to block 1034, where a process response thread is started, and then again proceeds to block 1022.

FIG. 10C starts in block 1040 and proceeds to block 1042. In block 1042, it is determined if a response has been received on port x (e.g., received by the process response thread). If no response has been received, flow waits at 1042. If a response has been received, flow proceeds to block 1044, and the client ID associated with port x is added to the response (e.g., by referring to the agent table 1120, shown in FIG. 11). The response is then sent to the TCP in block 1046 (e.g., for transmission to the device proxy). Flow then proceeds to block 1042.

Two example case studies will be discussed as examples with reference to the embodiments shown in FIGS. 9A-C and FIGS. 10A-C. Basically, the same explanation in the previous discussion of FIGS. 9A-C and FIGS. 10A-C can be applied.

The differences from the previous descriptions of FIGS. 9A-9C and FIGS. 10A-C will be discussed in detail below.

First, an example of a port forwarding user case that handles multiple client HTTP/TCP requests is disclosed. Referring to FIG. 8 again, consider two clients, for example like client 830A and client 830B in FIG. 8, which exist on the internet outside a firewall 802. Using HTTP, client 830A and client 830B want to access a web page on a web server running on device agent host 800. Device agent host 800 resides behind a corporate firewall 802. Device agent host 800 has a device proxy (device proxy host 804) that resides on the internet outside the corporate firewall 802 and is accessible to client 830A and client 830B. The following is a high-level description of the use case.

Now further refer to FIGS. 9A-C. Consider the case where a client 830A sends an HTTP GET request (GET1_REQUEST) to the device proxy host 804. As the device proxy host 804 receives the GET1_REQUEST (block 922), the device proxy host 804 assigns a client ID to the client 830A that sent the GET_REQUEST at block 924 and records appropriate data in the device proxy table 1110. At block 926, the device proxy host 804 sends the client ID of the client 830A and the GET1_REQUEST to the device agent host 800 via a TCP connection (TCP1, e.g., TCP socket 824) through the HTTP tunnel (e.g., tunnel 822). Then the flow proceeds to block 928. After confirming whether or not the process response thread is running at block 928, in block 930 the device proxy host 804 starts the process response thread if the process response thread is not running. The device proxy host 804 waits to receive a request from a client at block 922.

When the device agent host 800 receives the GET1_REQUEST at block 1022, the device agent host 800 extracts the client ID of the client 830A at block 1024. Next, the device agent host 800 opens port x on the device agent host 800 at block 1026, the device agent host 800 associates the GET1_REQUEST with the client 830A, with TCP1, and with the device agent host 800 target port (port x), and the device agent host 800 records them in the device agent table 1120 at block 1028. Next at block 1030, the device agent host 800 sends the GET1_REQUEST to port x. Then, after determining if the process response thread is running (block 1032), the device agent host 800 starts the process response thread at block 1034 if needed.

Next, consider the case where a client 830B sends an HTTP GET request (GET2_REQUEST) to the device proxy host 804. When the device proxy host 804 receives the GET2_REQUEST (block 922), the device proxy host 804 assigns a client ID to the client 830B that sent the GET2_REQUEST at block 924 and records appropriate data in the device proxy table 1110. At block 926, the device proxy host 804 sends the client ID of the client 830B and the GET2_REQUEST to the device agent host 800 via the TCP connection (TCP1, e.g., TCP socket 824) through the HTTP tunnel (e.g., tunnel 822). Then the flow proceeds to block 928. After determining whether or not the process response thread is running at block 928, at block 930 the device proxy host 804 starts the process response thread if the process response thread is not running. The device proxy host 804 then waits to receive any requests from clients at block 922.

When the device agent host 800 receives the GET2_REQUEST at block 1022, the device agent host 800 extracts the client ID of the client 830B at block 1024, and then the device agent host 800 opens port y on the device agent host 800 at block 1026. Next, the device agent host 800 associates the GET2_REQUEST with the client 830B, with TCP1, and with the device agent host 800 port (port y), and the device agent host 800 records them in the device agent table 1120, at block 1028. Next, at block 1030, the device agent host 800 sends the GET2_REQUEST to port y. Then, after determining if the process response thread is running (block 1032), the device agent host 800 starts the process response thread at block 1034 if needed.

When the device agent host 800 receives a response to the GET1_REQUEST (GET1_RESPONSE) from port x at block 1042, the flow proceeds to block 1044. At block 1044, the device agent host 800 retrieves recorded information from the device agent table 1120 and adds the client ID corresponding to the GET1_REQUEST (client 830A in this example) to the response. The device agent host 800 sends the response to the device proxy host 804 via TCP1 through the HTTP tunnel at block 1046.

In response to receiving at block 942, via TCP1, the response (GET1_RESPONSE) sent by the device agent host 800 at block 1046, at block 944 the device proxy host 804 identifies the client 830A as the destination by reading the client ID from the received response. Then the device proxy host 804 sends the response (GET1_RESPONSE) to the client 830A based on corresponding information from the device proxy table 1110.

In response to receipt of the response (GET2_RESPONSE) from port y by the device agent host 800 at block 1042, the flow proceeds to block 1044. The device agent host 800 retrieves recorded corresponding information from the device agent table 1120, adds the client ID corresponding to the client 830B to the response at block 1044. Next, the device agent host 800 sends the response to the device proxy host 804 via TCP1 through the HTTP tunnel at block 1046.

When the device proxy host 804 receives, via TCP1, the response (GET2_RESPONSE) sent by the device agent host 800 (sent in block 1046 as mentioned above) at block 942, the device proxy host 804 identifies the client 830B as the destination by using the client ID in the received response at block 944 and retrieves recorded corresponding information from the device proxy table 1110. Then the device proxy host 804 sends the response (GET2_RESPONSE) to the Client 830B.

The following is the second example of a use case, which describes a Port Forwarding Use Case Example with a Multiple Client SNMP (UDP) Request.

Two clients (a client 830A and a client 830B) exist on the internet outside any corporate firewall. The clients 830A and 830B want to use SNMP packets to retrieve device information from a target device (e.g., device agent host 800, target device 740). The device agent host 800 resides behind a corporate firewall. The device agent host 800 has a device proxy (the device proxy host 804) that resides on the internet outside the corporate firewall and is accessible to the clients 830A and 830B. Following is a high-level description of the use case:

The device agent host 800 contacts the device proxy host 804 using a long lived HTTP connection (HTTP1). Many of today's applications require server push style communications wherein a server (e.g., device proxy host 804) outside of a firewall needs to send data to a target device (e.g., device agent host 800, target device 740) inside a firewall without passively waiting for the target device to initiate a connection. This is a difficult problem due to the firewall protecting the target device. An HTTP connection is used to bypass the firewall. HTTP connections are initiated by a target device from within a firewall to a server/client outside the firewall. Usually the target device requests some data, the server/client responds with the requested data, and the HTTP connection is closed after the target device receives the requested data and without the target device receiving other data. With proper configuration, it is possible for the server/client to communicate requests to the target device and make the connection persistent. A persistent or "long lived HTTP connection" is an HTTP connection that is initiated by the target device through the firewall and is held open by the server/client (e.g., device proxy host 804) using various techniques, such as setting a very long connection timeout and using chunked mode for the HTTP connection. Once the server/client has a connection to the target device it can deliver data to the target device as needed.

The client 830A sends an SNMP request (SNMP1_REQUEST) to the device proxy host 804. The device proxy host 804 sends information to the device agent host 800 over HTTP1 to create a TCP connection (TCP1) within HTTP1 (block 924 and block 926) and records corresponding information in the device proxy table 1110. The device proxy host 804 sends SNMP1_REQUEST and the client ID of the client 830A to the device agent host 800 over TCP1 via HTTP tunnel 822, and then the device proxy host 804 determines if a process response thread is running at block 928. If process response thread is not running, the device proxy host 804 starts the process response thread at block 930 and then waits for any additional requests from other clients at block 922.

If the device agent host 800 receives an SNMP1_REQUEST at block 1022 via the tunnel (e.g., HTTP tunnel), the device agent host 800 extracts the client ID and the message at block 1024 and records corresponding information in the device agent table 1120. Then the device agent host 800 opens port x at block 1026. Next, the device agent host 800 associates the client ID with TCP1 and with the device agent host 800 target port (port x) at block 1028. The device agent host 800 sends SNMP1_REQUEST as a message to port x at block 1030, and the device agent host 800 confirms whether or not the process response thread is running at block 1032. The device agent host 800 starts the process response thread, if needed, at block 1034.

Next, consider the case where the client 830B sends an SNMP request (SNMP2_REQUEST) to the device proxy host 804. After receiving the SNMP request, the device proxy host 804 sends SNMP2_REQUEST and the client ID corresponding to the client 830B to the device agent host 800 over TCP1 and records corresponding information in the device proxy table 1110. When the device agent host 800 receives SNMP2_REQUEST at block 1022, the device agent host 800 extracts the client ID and message at block 1024. Then the device agent host 800 opens port y in accordance with the SNMP2_REQUEST at block 1026. Next, the device agent host 800 associates the client ID of the client 830B with TCP1 and the device agent host 800 target port (port y) at block 1028 and records corresponding information in the device agent table 1120. The device agent host 800 sends SNMP2_REQUEST as a message to port y at block 1030, and the device agent host 800 confirms whether or not the process response thread is running at block 1032. The device agent host 800 starts the process response thread, if necessary, at block 1034.

The functional flow of the use case from the device agent host 800 and the device proxy host 804 perspectives will be the same as described for the first use case. Thus, in response to the device agent host 800 receiving the response (SNMP1_RESPONSE) from port x at block 1042, the flow proceeds to block 1044. The device agent host 800 retrieves recorded corresponding information from the device agent table 1120 and adds the client ID corresponding to the client 830A to the response, at block 1044. Then the device agent host 800 sends the response (SNMP1_RESPONSE) to the device proxy host 804 via TCP1 through the HTTP tunnel, at block 1046.

In response to the device proxy host 804 receiving (at block 942), via TCP1, the response sent by the device agent host 800 at block 1046, the device proxy host 804 identifies the client 830A as a destination by using the client ID in the response received from the device agent host 800 at block 944, and retrieves recorded corresponding information (e.g., the client port) from device proxy table 1110. Then the device proxy host 804 sends the received response (SNMP1_RESPONSE) to Client 830A, for example by using the retrieved client port.

In response to the device agent host 800 receiving the response (SNMP2_RESPONSE) from port y at block 1042, the flow proceeds to block 1044. The device agent host 800 retrieves recorded corresponding information from the device agent table 1120 and adds the client ID corresponding to Client 830B to the response at block 1044. Next, the device agent host 800 sends the response (SNMP2_RESPONSE) to the device proxy host 804, via TCP1, through the HTTP tunnel, at block 1046.

In response to the device proxy host 804 receiving, via TCP1, the response at block 942 sent by the device agent host 800 at block 1046, the device proxy host 804 identifies the client 830B as the destination by using the client ID in the response at block 944 and retrieves recorded corresponding information (e.g., the client port) from the device proxy table 1110. Next, the device proxy host 804 sends the response (SNMP2_RESPONSE) to the client 830B, for example by using the retrieved client port.

A communication method, which allows communication via an HTTP tunnel among clients 830A-830B and a target device, is disclosed. And the communication method may be performed by a CPU 300. In the communication method, the CPU 300 may perform the operations of a device proxy 720 to establish at least an HTTP tunnel. Of course, more than one HTTP tunnel may be established. The CPU 300 may perform the operations of the device proxy 720 to maintain the HTTP tunnel's persistence. The CPU 300 may perform the operations of the device proxy 720 to transmit data, including GET1_REQUEST and/or SNMP1_REQUEST, from the client 830A to the device agent host 800, for example via TCP1 within the HTTP tunnel. The CPU 300 may perform the operations of the device proxy 720 to transmit GET2_REQUEST and/or SNMP2_REQUEST from Client 830B to the device agent host 800, for example via TCP1 within the HTTP tunnel, which is kept persistent during the communication. Additionally, in some embodiments, other components (e.g., bus, network card, hard drive, memory controller) of a computing device may perform at least part of the above operations or the operations described below, and the other components may be controlled by the CPU 300.

Thus, GET1_REQUEST, SNMP1_REQUEST, GET2_REQUEST, and SNMP2_REQUEST may be sent through the firewall 802 via the device proxy host 804 by using the common HTTP tunnel, which is kept persistent at least during the series of message exchanges.

Additionally, the target device 740 and/or device agent host 800 may communicate with the client 830A and the client 830B via the device proxy host 804, and the CPU 300 in the device proxy host 804 may implement the device proxy 820. The CPU 300 may cause the device proxy 820 to send GET1_REQUEST, SNMP1_REQUEST, GET2_REQUEST, and SNMP2_REQUEST through the HTTP tunnel. The CPU 300 may implement the device proxy 820 to identify destinations (by using client IDs) for the responses to the messages (including GET1_REQUEST, SNMP1_REQUEST, GET2_REQUEST, and SNMP2_REQUEST) that are received from the device agent host 800.

The CPU 300 may implement the device proxy 820 in order to transfer the responses to the identified destinations (Client 830A and/or Client 830B). The CPU 300 is an example of a computing processor and may be implemented by plural cores of CPU(s), multiple separated CPUs, or other hardware designs. Such CPU(s) may be referred as a computing processor.

FIG. 11 illustrates examples of embodiments of client ID tables. A device proxy table 1110 includes a client port field 1113, to identify a client (device, application, etc.) that sends a request/message to the device proxy, and a client ID field 1117 that includes client IDs assigned to respective clients/ports by the device proxy. The client port field 1113 may include the port on the device proxy that received the communication from the client to allow the device proxy to send a reply to the client on the same port that the request was received and/or to add a level of abstraction about the client (e.g., hide whether or not the client is an application, a separate computing device, etc.). The client ID field 1117 may include client IDs that are arbitrarily assigned to different clients by the device proxy. The device proxy table 1110 may be used to map a message received from a device agent (e.g., received via a TCP connection) to a client. The proxy table 1110 also includes a TCP port field 1111, which may be used to map client ports and client IDs to a TCP port, for example if multiple TCP connections are implemented by the device proxy and the device agent.

A device agent table 1120 includes a client ID field 1123 and a target port field 1125. The client ID field 1123 includes client IDs assigned to messages by a device proxy. The client ID field may be populated by extracting the client ID from a received packet. The target port field 1125 indicates the target port on the target device the received message is forwarded to. The device agent table allows a reply to the forwarded message to be mapped to the client ID associated with the request, and the client ID may be added to the reply and the reply may then be sent back to the client (e.g., via the TCP connection and the device proxy). The device agent table 1120 also includes a TCP port field 1121, which may be used to map client IDs to a TCP port, for example if multiple TCP connections are implemented by the device proxy and the device agent.

The above described devices, systems, and methods can be achieved by supplying one or more storage media having stored thereon computer-executable instructions for realizing the above described operations to one or more devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement at least part of the operations of the above described embodiments. Thus, the computer-executable instructions and/or the one or more storage media storing the computer-executable instructions therein constitute an embodiment.

Any applicable computer-readable storage medium can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for TCP multiplexing over a proxy, wherein the proxy consolidates multiple TCP requests from clients into one TCP connection between the proxy and a server, the method comprising:
    opening a persistent TCP connection between a proxy and a server;
    receiving a connection request from a client at the proxy;
    assigning a unique identifier to the client at the proxy;
    signaling the server over the persistent TCP connection to register the unique identifier of the client;
    receiving outgoing data from the client at the proxy;
    prepending the unique identifier of the client to the outgoing data at the proxy;
    forwarding the prepended outgoing data from the proxy to the server over the persistent TCP connection;
    receiving incoming data from the server at the proxy over the persistent TCP connection, wherein the incoming data includes the unique identifier of the client;
    extracting the unique identifier from the incoming data at the proxy;
    identifying the client and a corresponding client connection based on the extracted unique identifier; and
    sending at least some of the incoming data to the client over the corresponding client connection.

2. A method according to claim 1, the method further comprising, at the proxy, associating a port of the proxy with the client and the unique identifier of the client.

3. The method according to claim 2, wherein the identifying of the corresponding client connection based on the extracted unique identifier is based at least in part on the port of the proxy that is associated with the extracted unique identifier.

4. A method according to claim 1, the method further comprising removing the unique identifier from the incoming data before sending the incoming data to the client over the corresponding client connection.

5. A method according to claim 1, further comprising composing a command sequence which includes a command to register the client and the unique identifier of the client, wherein signaling the server comprises sending the command sequence over the persistent TCP connection to the server.

6. A method according to claim 1, the method further comprising composing a command sequence which includes a command to return data, the unique identifier of the client, and the outgoing data from the client, wherein forwarding the prepended outgoing data comprises sending the command sequence from the proxy to the server.

7. A method according to claim 1, the method further comprising receiving a request from the client to close the client connection.

8. A method according to claim 7, wherein responsive to the request from the client to close the client connection, the method further comprises:
    canceling the assignment of the unique identifier to the client; and
    signaling the server over the persistent TCP connection to unregister the unique identifier.

9. A proxy which consolidates multiple TCP requests from clients into one TCP connection between the proxy and a server, the proxy comprising:

a computer-readable memory constructed to store computer-executable process steps; and a processor constructed to execute the computer-executable process steps stored in the memory;

wherein the process steps stored in the memory cause the processor to perform TCP multiplexing, and wherein the process steps stored in the memory include computer-executable steps to:

open a persistent TCP connection between the proxy and the server;

receive a connection request from a client at the proxy, wherein the connection request comprises a request for establishment of a new connection between the client and the server;

assign a unique identifier to the client;

signal the server over the persistent TCP connection to register the unique identifier of the client;

receive a data request from the client, wherein the data request comprises a request for data on the server;

prepend the unique identifier of the client to the data request;

forward the prepended data request to the server over the persistent TCP connection;

receive prepended data from the server over the persistent TCP connection, wherein the prepended data includes an identifier prepended to incoming data;

extract the identifier and the incoming data from the prepended data;

identify a client and a client connection that correspond to the extracted identifier; and send at least some of the extracted incoming data to the client that corresponds to the extracted identifier.

10. A proxy according to claim 9, wherein the process step to open the persistent TCP connection between the proxy and the server comprises exchanging an ECHO command between the server and the proxy.

11. The proxy according to claim 9, wherein the server and the proxy are separated by a firewall which exposes the proxy to incoming connection requests and which shields the server from such requests, and wherein the step to open the persistent TCP connection between the proxy and the server comprises receipt of an ECHO command from the server and a response thereto from the proxy.

12. A proxy according to claim 9, the process steps stored in the memory further including computer-executable steps to close the persistent TCP connection between the server and the proxy.

13. A proxy according to claim 9, the process steps stored in the memory further including computer-executable steps to compose a command sequence which includes a command to register the client and the unique identifier of the client, wherein the step to signal the server comprises sending the command sequence over the persistent TCP connection to the server.

14. A proxy according to claim 9, the process steps stored in the memory further including computer-executable steps to compose a command sequence which includes a command to return data, the unique identifier of the client, and the data request from the client, wherein the step to forward the prepended data request comprises sending the command sequence to the server.

15. A proxy according to claim 9, the process steps stored in the memory further including computer-executable steps to receive a request from the client to close the client connection.

16. A proxy according to claim 15, wherein responsive to the request from the client to close the client connection, the process steps stored in the memory further including computer-executable steps to:

cancel the assignment of the unique identifier to the client; and signal the server over the persistent TCP connection to unregister the unique identifier.

17. One or more computer-readable memory media on which is stored computer-executable instructions for causing one or more computing device to perform operations for TCP multiplexing over a proxy, wherein the proxy consolidates multiple TCP requests from clients into one TCP connection between the proxy and a server, the operations comprising:

opening a persistent TCP connection between a proxy and a server;

receiving a connection request from a client at the proxy, wherein the connection request comprises a request for establishment of a connection between the client and the server;

assigning a unique identifier to the client;

signaling the server over the persistent TCP connection to register the unique identifier for the client;

receiving outgoing data from the client at the proxy;

prepending the unique identifier of the client to the outgoing data at the proxy;

forwarding the prepended outgoing data from the proxy to the server over the persistent TCP connection;

receiving prepended incoming data at the proxy from the server over the persistent TCP connection, wherein the prepended incoming data includes an identifier prepended to incoming data;

extracting the identifier and the incoming data from the prepended incoming data;

identifying a client that corresponds to the extracted identifier; and sending the extracted incoming data to the client that corresponds to the extracted identifier.

18. A method for communicating among a first information apparatus and a server device via an HTTP tunnel, the method being performed by a computing device, the method comprising:

establishing at least one HTTP tunnel with a server device;

assigning a first identifier to a first information apparatus;

sending a message to the server device over the HTTP tunnel to register the first identifier of the first information apparatus;

receiving first data from the first information apparatus;

prepending the first identifier to the first data;

sending the first data, with the prepended first identifier, to the server device in accordance with a predetermined communication protocol within the HTTP tunnel;

receiving second data from the server device over the HTTP tunnel, wherein the second data includes the first identifier of the first information apparatus;

extracting the first identifier from the second data;

identifying the first information apparatus and a corresponding client connection based on the extracted first identifier; and sending at least some of the second data to the first information apparatus over the corresponding client connection.

19. A communication method according to claim 18, further comprising:

associating a port with the first identifier of the first information apparatus, wherein identifying the first information apparatus and the corresponding client connection based on the extracted first identifier is based at least in part on the port that is associated with the first identifier.

20. A communication method according to claim 19, further comprising:
recording the first identifier in a proxy table, wherein, in the proxy table, the first identifier is associated with the first information apparatus and with the port; and
recording a second identifier in the proxy table, wherein, in the proxy table, the second identifier is associated with a second information apparatus and with a second port.

* * * * *